Feb. 13, 1968

B. E. WRENSCH ET AL 3,368,657

NOISE-CONTROLLING ARMATURE FOR
BRAKES, CLUTCHES AND THE LIKE
Filed Aug. 23, 1965

INVENTORS
BERNARD E. WRENSCH
LLOYD A. FITZGERALD

BY Wheeler, Wheeler + Wheeler
ATTORNEYS

United States Patent Office 3,368,657
Patented Feb. 13, 1968

3,368,657
NOISE-CONTROLLING ARMATURE FOR BRAKES, CLUTCHES AND THE LIKE
Bernard E. Wrensch, Brookfield, and Lloyd A. Fitzgerald, Wauwatosa, Wis., assignors to Stearns Electric Corporation, Milwaukee, Wis., a corporation of Wisconsin
Filed Aug. 23, 1965, Ser. No. 481,858
7 Claims. (Cl. 192—84)

ABSTRACT OF THE DISCLOSURE

Electromagnetically induced vibration is damped by subdividing the armature into segments which are mounted on a hub in driving connection with a rotor, but are capable of independent axial movement, such segments together constituting a complete annulus preferably integral with their hub or at least providing a flux return path to and through the hub.

---

This invention relates to a noise-controlling armature for brakes, clutches and the like.

As pointed out in companion application Ser. No. 481,789, now Patent No. 3,326,434, entitled Electromagnetic Clutch or Brake With Armature Dynamically Damped Against Audible Vibration and filed in the names of Leo L. Stukens and Robert H. Trede, clutches and brake sometimes develop audible vibration in the course of engagement or disengagement. The companion application above identified discloses one means for reducing the audible vibration produced in such a clutch. The instant application concerns another way of accomplishing this result.

It is immaterial to the invention whether the armature is used in a brake or a clutch. There is no significant difference between brakes and clutches of this character, from the standpoint of the invention here involved. The instant device is a clutch only because both of the frictionally engaging elements are rotatable. If one were fixed against rotation, it would function as a brake.

In the instant device, audible vibrations are damped by dividing the armature plate, preferably upon a chord which is preferably either radial or diametrical.

The damping effect is produced because the component parts are free for independent movement, even though their separation is only partial. Being free for independent movement, the mass of any given vibratory part is reduced, thus changing the frequency to which it will respond. Also, the movement of the respective parts of the armature either circumferentially or radially provides at relatively short intervals interfaces between metal and air which reflect vibrations, newly originated waves and reflected waves tending to interfere with each other.

Figure 1:
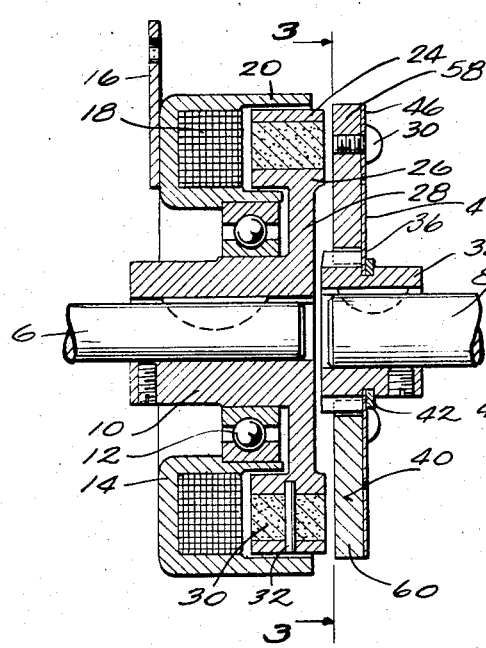
FIG. 1 is a view in axial section through a clutch embodying the invention.

The instant device is identifiable as a clutch because both of the engageable parts are mounted for rotation. While it is broadly immaterial which shaft is the driving shaft and which the driven shaft, the shaft 6 will be characterized for the purpose of this application as the driving shaft and the shaft 8 as the driven shaft.

The hub 10 mounted on the driving shaft carries a bearing 12 seated in the annular magnet frame 14. In accordance with conventional practice, this frame is provided with an arm 16 for connection with a link (not shown) to restrain it against rotation. The magnet frame has the usual channel for winding 18. Its outer annular polar extension 20 and inner annular polar extension magnetize an outer polar extension 24 and an inner polar extension 26, both of which are connected to rotate with hub 10. The inner polar extension 26 is formed on an integral flange 28 of hub 10. The polar extension 26 is encircled by an annular mass of friction material at 30. Radial pins such as that shown at 32 may be used, if desired, to mount the polar extension 24 on the exterior surface of the ring of friction material 30.

Figure 2:
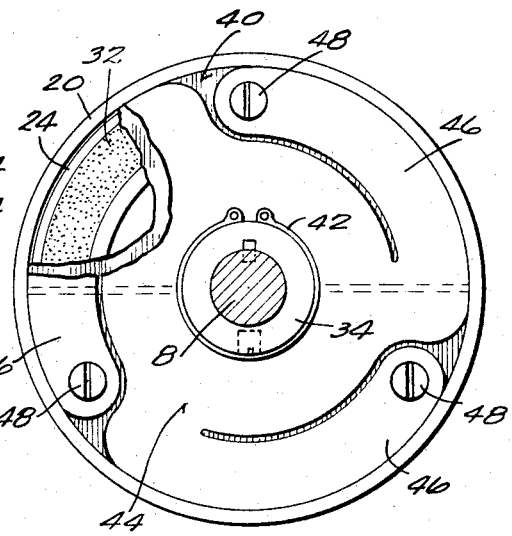
FIG. 2 is a view thereof in end elevation with the shaft shown in section and portions of the armature being broken away.

The hub 34 on the driven shaft 8 is provided with radially projecting splines 36 upon which the armature 40 (or its component parts) may be mounted for limited axial movement relative to the hub, while being connected to the hub for rotation. The ring 42 serves as a stop defining the outer limit of movement of the armature 40 away from the polar extensions 24 and 26. The spring 44 abuts the stop and has resilient arms 46 which extend arcuately as best shown in FIG. 2 and have their free ends connected as by screws 48 to the armature 40. The center of the spring is confined between the ends of splines 36 and the split ring 42. When the armature is attracted by the polar extensions and is thereby caused to move axially upon the splines, the arms 46 are flexed from their normal flat positions and therefore are biased in a direction tending to return the armature to the position shown in FIG. 1.

Figure 4:
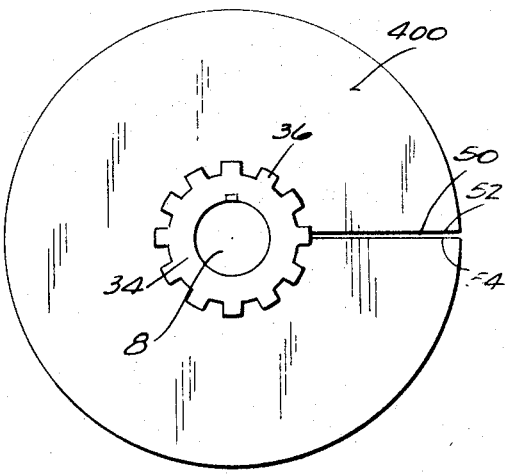
FIG. 4 is a view similar to FIG. 3 showing a modified embodiment.

In accordance with the present invention, the armature 40 does not constitute a solid disk but is divided for the purpose of reducing audible vibrations therein. The number of pieces is relatively unimportant. As shown in FIG. 4, the armature 400 is still one piece although a radial cut 50 gives it the form of a split disk with mutually spaced free margins at 52 and 54.

Figure 3:
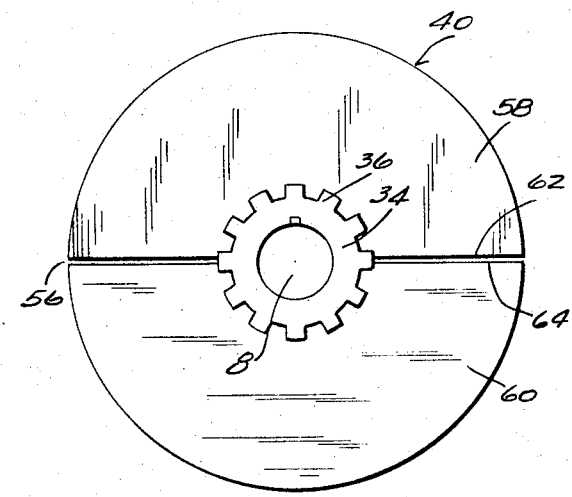
FIG. 3 is a view taken in section on the line 3—3 of FIG. 1.

In the embodiment shown in FIG. 3, the armature 40 is divided on a diametrical line 56 to comprise two separate components 58 and 60 having opposed free margins respectively at 62 and 64. Since the armature, in both embodiments, is notched on its inner periphery for complementary engagement with splines 36, the splines will not only key the armature to the hub but will also interlock with the several component parts to preclude any radial movement of the respective parts outwardly with regard to the hub.

As already explained, the armature is rendered non-resonant to audible vibration by dividing it into components which are individually of low mass. In addition, the change of form from annular to semi-annular or less (or to the form of a split ring) also tends to render the armature non-resonant. In addition, as also explained above, the free edges resulting from the division of the armature into segments provide an interface with air which tends ot reflect vibration so that newly originated vibrations and reflected vibrations will tend to cancel each other, or at least, to interfere to reduce resonance. In any event, audible squeaks or squeals are substantially eliminated when the divided armature plate is used.

We claim:

1. A non-resonant sound dampening armature for engagement with a friction surface in a clutch or the like and for mounting on a hub, said armature comprising an annulus having inner peripheral portions connected with the hub and providing a flux return path thereto and having an outer periphery intersected by a cut with which the annulus is provided and which subdivides at least the outer portion of the annulus into component parts of relatively low mass and with mutually spaced margins, said parts having portions free and mounted for limited movement relative to each other for damping audible vibration.

2. An armature according to claim 1 in which said cut extends substantially upon a chord of the annulus.

3. An armature according to claim 1 in which the cut with which the armature is provided is radial and substantially rectilinear.

4. An armature according to claim 1 in which the cut is diametrical and completely severs the armature into separate and substantially equal segments.

5. An electromagnetic coupling device comprising the combination with an electromagnet and a first clutch element having a friction surface, of a second clutch element comprising an armature in the field of said magnet and having a second friction surface for engagement with the friction surface of the first clutch element, said second clutch element comprising the combination with a rotatable mounting, of a plurality of individual component segments constituting the armature and respectively having means connecting them individually with the mounting means for accommodating relative axial movement and for constraining them for rotation with the mounting means.

6. In an electromagnetic clutch, a noise-controlling armature adapted to engage a complementary friction surface in said clutch, said armature comprising the combination of a mounting hub having splines, and separate armature segments comprising components which together constitute a non-resonant generally annular armature, each such segment having on its inner periphery teeth complementary to the splines and individually interlocked therewith against outward radial movement, the interlock between the splines and the armature segments accommodating independent axial movement of each segment with respect to the hub and with respect to the other segments for damping audible vibration while constraining the segments and the hub to rotate as a unit.

7. In an electromagnetic clutch, a noise-controlling armature adapted to engage a complemenary friction surface in a clutch or the like, said armature comprising the combination with a mounting hub having splines, and separate armature segments comprising components which together constitute a generally annular armature, each such segment having on its inner periphery teeth complementary to the splines and individually interlocked therewith against outward radial movement, the interlock between the splines and the armature segments accommodating axial movement of the segments with respect to the hub while constraining the segments and the hub to rotate as a unit, means comprising a stop on the hub for limiting axial movement of the armature in one direction with respect to the hub, and a normally flat spring intervening between the armature and the stop and having resilient arcuate arms terminally connected with the armature segments and biasing the armature toward said stop.

References Cited

UNITED STATES PATENTS

| | | | |
|---|---|---|---|
| 1,519,417 | 12/1924 | Payne | 192—84 X |
| 2,063,203 | 12/1936 | Stanley | 192—89 X |
| 2,098,266 | 11/1937 | Walker | 192—107 X |
| 2,138,837 | 12/1938 | Cadman | 192—107 X |
| 2,407,757 | 9/1946 | MacCallum | 192—89 X |
| 2,426,942 | 9/1947 | Miller | 192—84 |
| 2,684,744 | 7/1954 | Myers | 192—84 X |

BENJAMIN W. WYCHE III, *Primary Examiner.*